Patented Oct. 7, 1924.

1,511,003

UNITED STATES PATENT OFFICE.

DAVID CHARLES POLDEN, OF SURBITON, ENGLAND.

METHOD FOR THE PRODUCTION OF MOLDED ARTICLES AND SO FORTH FROM CASEIN AND THE LIKE.

No Drawing. Application filed January 25, 1924. Serial No. 688,611.

*To all whom it may concern:*

Be it known that I, DAVID CHARLES POLDEN, a subject of the King of England, and resident of Surbiton, in the county of Surrey, in the Kingdom of England, have invented a certain new and useful Method for the Production of Molded Articles and So Forth from Casein and the like, of which the following is a specification.

This invention relates to a method for the production of molded articles and so forth from casein and the like, its object being to provide a quicker and cheaper process than that hitherto employed.

According to this invention I firstly take any variety of casein for example, rennet casein, preferably in powder form or in finely ground particles. This I form into a paste or solution by the addition of any suitable casein solvent or softening agent dissolved in water and I may use an alkaline, acid or neutral substance for this purpose.

Of the alkaline substances I may for instance use any of the following: caustic soda, caustic potash, sodium carbonate, sodium bi-carbonate, sodium oxide, sodium peroxide, ammonium hydroxide, ammonium carbonate, potassium carbonate or the like.

Of the acid substances I may for instance use any of the following: acetic acid, hydrochloric acid or any acid salt thereof, or any other acid or acid salts which will effect the same purpose.

Of the neutral substances I may for instance use any of the following: ammonium fluoride, sodium fluoride, or any salt thereof or any neutral salt of hydrofluoric acid or any other substance which will effect the same purpose.

In making either a paste or a solution of the casein, the selected solvent or softener is dissolved in a sufficiency of water, and added to the casein while stirring.

If the articles to be made are required to be clear and transparent, either casein, precipitated from a clear alkaline solution of casein, is made into a paste or a solution, and used as hereafter explained, or else the ordinary casein may be made into a solution which must be allowed to clarify by allowing the impurities to sink to the bottom of the vessel in which the solution is being made. If this procedure is followed, the supernatant clear solution is to be used as hereinafter explained.

In other cases, the casein is made into either a cloudy solution or a paste, and the next operation is proceeded with.

Any colouring matter which it may be desired to incorporate in the paste or solution is, in the case of the solution, to be dissolved in a sufficiency of water and added thereto, while in the case of a paste, the colouring matter should be dissolved in the solution of the solvent or softener and added in this manner to the casein.

The paste or solution is next heated, advantageously in a jacketed pan, up to from 90 to 180 degrees Fahrenheit. If the paste should contain any lumps, they must be pulverized or broken up by vigorous stirring, for which purpose a mechanical stirrer may preferably be used, so that the result is a smooth cream paste ready for the next operation.

To this smooth cream paste is added a sufficient quantity of dilute acid or alkali (according to the solvent or softener used) in order to neutralize the solvent or softener.

When rennet casein is used there is an additional novel feature in the present process in that instead of the casein being precipitated as a flocculent mass or as a fine powder, the casein is immediately separated as a coagulum. If other than rennet casein has been used, the casein is separated as an adhering flocculent mass. If the temperature used is below 90 degrees Fahrenheit, the casein is not so well coagulated as when a higher temperature above 90 degrees is used. If, on the other hand, the temperature is too high, the casein becomes hydrolized and the yield is not so great, while the articles produced are liable to be brittle.

The coagulum is now molded with pressure between wet cloths for about 6 hours. After this first pressing, the sheets are again molded with pressure into the shape of the articles to be made, and this second pressing lasts about 18 hours. In this second pressing, the moulds should have a smooth and polished surface, in order to impart a glossy appearance to the articles. At the end of the 18 hours, the pressure is removed and the articles are placed upon some rigid absorbent material such as paste board, three-ply wood, sheet-cork, or the like, in order to free them from their excessive moisture. During this time, the articles intended to be clear will assume transparency. The articles are left in this state for from 2 to 10 days according to their thickness. At the end of this time the articles are immersed in a hardening and waterproofing solution composed of the following approximate percentages: Distilled water 45%, solution of 40% strength formic aldehyde 45%, glycerine 10%. The articles are left in this solution for from 2 days to 3 weeks according to their thickness. After this time, the articles are removed from the solution, the excessive solution drained off, and the articles finally dried at an even temperature of about 65 degrees Fahrenheit.

The advantages of this process are:

(1) That the invention carried into effect as described produces a high-class casein solid.

(2) That owing to the dissolving or softening of the casein, the effect is to give, when precipitated a smooth homogeneous coagulum, and therefore the finished material is free from specks and irregularities of colour.

(3) That owing to the low temperature used, the casein is easy to manipulate throughout.

(4) That owing to the low temperature used, the material is not liable to be brittle.

(5) That owing to the precipitation and production of the coagulum being one operation, the trouble and time taken in precipitating the casein from alkaline solution, and subsequently coagulating or otherwise treating in making it solid is thereby obviated.

(6) That owing to the ease with which a clear material is produced, the imitation of tortoise-shell, horn, and amber and the like is simple and inexpensive.

(7) That the process admits of a large amount of "fillers" to be incorporated in the material.

I claim:

1. The production of molded articles from casein by taking finely pulverized casein, adding thereto a solvent, the resultant product being heated to between 90 and 180 degrees Fahrenheit, vigorously stirred and then neutralized by the addition of a suitable agent whereby the casein is separated as an adhering flocculent mass which is molded under pressure for 6 hours then subjected to a fresh pressure for 18 hours, then allowed to drain and finally, after two to ten days the molded articles are hardened and waterproofed by a suitable composition, drained and dried at even temperature.

2. The production of molded articles from casein by taking finely pulverized casein, adding thereto a solvent, the resultant product being heated to between 90 and 180 degrees Fahrenheit, vigorously stirred and neutralized by the addition of a suitable agent whereby the casein is separated as an adhering flocculent mass which is molded under pressure for 6 hours then subjected to a fresh pressure for 18 hours, then allowed to drain for two to ten days then hardened and waterproofed in a solution of 45% distilled water, 45% of 40% strength formic aldehyde, and 10% glycerine for two days to three weeks, then drained and finally dried at a temperature of about 65 degrees Fahrenheit.

DAVID CHARLES POLDEN.